United States Patent
Ikeda et al.

(10) Patent No.: US 6,915,835 B2
(45) Date of Patent: Jul. 12, 2005

(54) DIE CLAMPING SYSTEM AND METHOD OF CLAMPING DIE

(75) Inventors: Tomoaki Ikeda, Kariya (JP); Koichi Kawaura, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 8 days.

(21) Appl. No.: 10/265,952

(22) Filed: Oct. 7, 2002

(65) Prior Publication Data

US 2003/0070784 A1 Apr. 17, 2003

(30) Foreign Application Priority Data

Oct. 11, 2001  (JP) ........................................ 2001-314064

(51) Int. Cl.[7] ........................ B22D 17/26; B22D 33/04
(52) U.S. Cl. ...................... 164/137; 164/341; 164/342
(58) Field of Search ............................... 164/137, 341, 164/342, 113, 312

(56) References Cited

U.S. PATENT DOCUMENTS

| 2,984,176 | A | * | 5/1961 | Sommer et al. ............ 164/341 |
| 3,199,159 | A | * | 8/1965 | Wernecke ................... 164/341 |
| 4,417,616 | A | * | 11/1983 | Seitz ............................ 164/113 |
| 4,601,323 | A | * | 7/1986 | Doucet et al. ............... 164/312 |
| 5,238,394 | A | * | 8/1993 | Hirata ......................... 425/590 |
| 5,533,564 | A | * | 7/1996 | Alberola et al. ............ 164/342 |
| 5,810,067 | A | * | 9/1998 | Atari et al. .................. 164/120 |
| 6,422,297 | B2 | * | 7/2002 | Salata ......................... 164/312 |

FOREIGN PATENT DOCUMENTS

| GB | 2 064 415 | * | 6/1981 | ............ B29C/1/16 |
| JP | 03-216255 | | 9/1991 | ............ B22D/17/00 |
| JP | 06-190526 | | 7/1994 | ............ B22D/17/22 |

* cited by examiner

Primary Examiner—Kevin P. Kerns
(74) Attorney, Agent, or Firm—Knoble Yoshida & Dunleavy (57) ABSTRACT

A die-clamping system has a die and a clamping device. The die includes a first engaging portion in a first predetermined shape. The die is transferred in a first direction from a first position toward a second position. The clamping device has a second engaging portion in a second predetermined shape that is complementary to the first predetermined shape. The second engaging portion of the clamping device at the second position completes engagement with the first engaging portion by the time when the die arrives at the second position in the first direction.

20 Claims, 8 Drawing Sheets

DIE CLAMPING SYSTEM AND METHOD OF CLAMPING DIE

BACKGROUND OF THE INVENTION

The present invention relates to a die-casting system and more particularly relates to a die-clamping system that efficiently clamps a die at a carried-out position after casting operation is completed.

To improve production efficiency in a die-casting system, it has been proposed that a die system alternately transfers a plurality of dies. The system of such type is, for example, disclosed in Unexamined Japanese Patent Publication No. 6-190526. The disclosed die-casting system includes a die-casting apparatus and a die-opening apparatus. The die-casting apparatus functions as a molding machine to perform mold closing and liquid injection. The die-opening apparatus opens the die to release a die-cast product after spraying the die with a die releasing agent. The die-casting apparatus and the die-opening apparatus are arranged in a horizontal manner. Additionally, carriage systems sandwich the above devices and are arranged on both sides of the above devices. The above system is a shuttle type die-casting system that transfers two sets of dies between the die-casting apparatus and the die-opening apparatus by utilizing a plurality of carriage means whose transferring directions intersect with each other. Thereby, the two sets of die are alternately carried into and out of the die-casting apparatus.

In the die-exchangeable type die-casting system, the above transferring direction intersects the carried-out direction. When the carried-out die is transferred from a carried-out position toward a die opening position, the set of dies needs to be positioned and clamped by the carriage device at the carried-out position. Then, one of the carriage devices is equipped with a clamping system that is operated by an electric actuator or a hydraulic actuator. The clamping system clamps the die after the die is positioned at the carried-out position.

An unwanted effect of the above-mentioned clamping system is that the carriage device cannot start to move until the clamping system completes its clamping operation. In other words, the clamping system must wait to initiate its movement to reach the carried-out position till the die is positioned at the carried-out position. After the clamping operation is completed, the carriage device finally starts to move. As a result, cycle time becomes longer, and manufacturing cost increases. Additionally, the clamping system itself becomes relatively large. For the above reasons, there is a need for a die-clamping system that efficiently clamps a die.

In order to solve the above and other problems according the first aspect of the current invention, a die-clamping system including a die including a first engaging portion in a first predetermined shape, the die being transferred in a first direction along carriage rails from a first position toward a second position, and clamping means having a second engaging portion in a second predetermined shape that is complementary to the first predetermined shape, wherein the second engaging portion of the clamping means at the second position substantially clamps the first engaging portion against movement in a second direction along die rails that intersect the carriage rails by the time when the die arrives at the second position in the first direction.

According to the second aspect of the current invention, a die-clamping system including a die including a first engaging portion having a first predetermined shape, the die being transferred along carriage rails in a first direction from a first position toward a second position, and clamping means having a second engaging portion in a second predetermined shape that is complementary to the first predetermined shape, wherein the second engaging portion of the clamping means at the second position substantially clamps the first engaging portion against movement in a second direction along die rails that intersect the carriage rails as the die arrives at the second position in the first direction.

According to the third aspect of the current invention, a method of efficiently clamping a die, including the steps of providing a die having a first engaging portion in a first predetermined shape, providing a clamping means having a second engaging portion in a second predetermined shape that is complementary to the first predetermined shape, transferring the die in a first direction along carriage rails from a first position toward a second position, initiating insertion of the first engaging portion into the second engaging portion, completing engagement of the first engaging portion with the second engaging portion by the time when the die arrives at the second position, and substantially clamping the first engaging portion against movement in a second direction along die rails that intersect the carriage rails.

According to the fourth aspect of the current invention, a method of efficiently clamping a die, including the steps of providing a die having a first engaging portion in a first predetermined shape, providing a clamping means having a second engaging portion in a second predetermined shape, transferring the die in a first direction along carriage rails from a first position toward a second position, initiating insertion of the first engaging portion into the second engaging portion, completing engagement of the first engaging portion with the second engaging portion in a complementary manner by the time when the die arrives at the second position, and substantially clamping the first engaging portion against movement in a second direction along die rails that intersect the carriage rails.

According to the fifth aspect of the current invention, a die-clamping system including a die including a first engaging portion in a first predetermined shape, the die being transferred along carriage rails in a first direction from a first position toward a second position, a die transfer unit for transferring the die from the second position to a third position along die rails in a second direction, and a clamping unit mounted on the die transfer unit and having a second engaging portion in a second predetermined shape that is complementary to the first predetermined shape, wherein the second engaging portion of the clamping unit at the second position substantially clamps the first engaging portion against movement in the second direction along the die rails that intersect the carriage rails by the time when the die arrives at the second position in the first direction, upon completing the engagement, the transfer unit transferring the die from the second position to the third position along the die rails.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

A preferred embodiment of the present invention will now be described with reference to FIGS. 1 through 8. A die-clamping system of the preferred embodiment employs a multi-function die apparatus.

Figure 1:
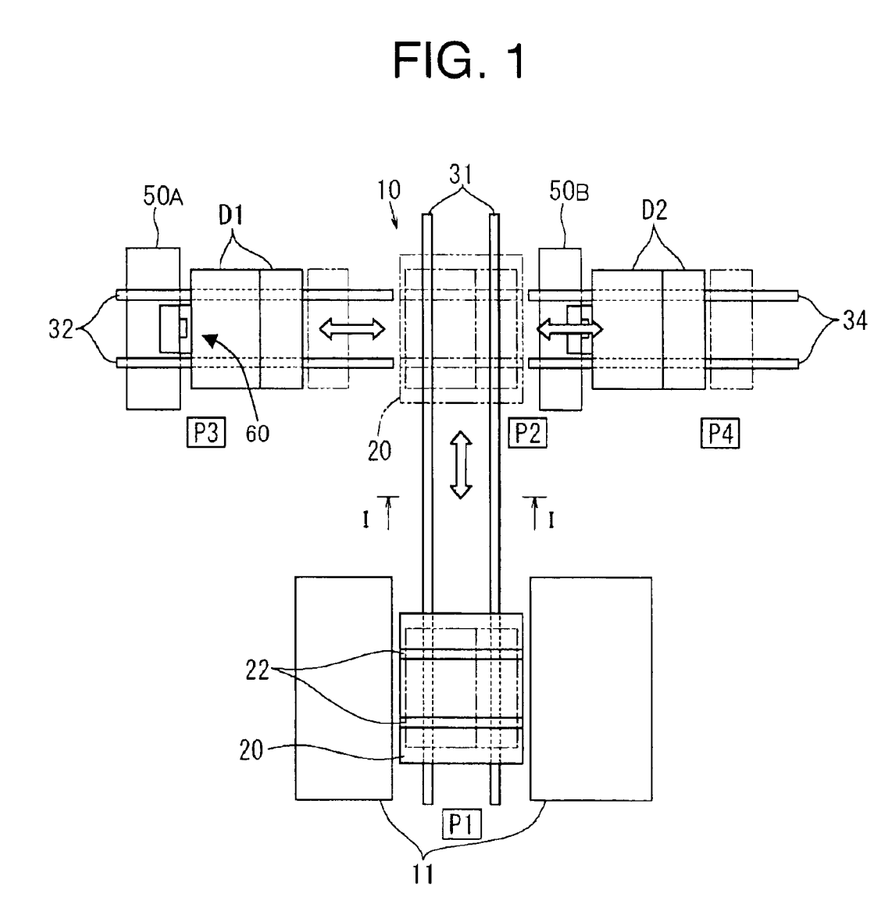
FIG. 1 is a schematic plan view of a die-casting system according to a preferred embodiment of the present invention.

Now referring to FIG. 1, a die-casting system 10 according to the preferred embodiment is a die-exchangeable type. The die-casting system 10 includes two dies D1 and D2, a single die-casting apparatus 11, a single die carriage 20, a pair of carriage rails 31, two pairs of die rails 32 and 34, and two multi-function die apparatuses 50A and 50B.

Still referring to FIG. 1, the die-casting apparatus 11 is configured to close the dies D1 and D2 and to inject molten material into the dies D1 and D2. The die-casting apparatus 11 includes a die-closing means. The die-casting apparatus 11 tightly presses the closed die D1 or D2 by pressing outside the die D1 or D2 that has been carried into a casting position P1. The die-casting apparatus 11 also includes an injecting device that injects molten material into the cavity of the die D1 or D2 after the die D1 or D2 is tightly closed.

Still referring to FIG. 1, the multi-function die apparatuses 50A and 50B are configured to move in the direction of the corresponding die rails 32 or 34. A drive mechanism moves the multi-function die apparatuses 50A and 50B from the carried-out position P2 to corresponding opening/closing positions P3 and P4. The drive mechanism includes a ball-screw mechanism that is driven by an electric motor. Each of the multi-function die apparatus 50A and 50B includes a clamping system 60. The clamping system 60 clamps and releases the dies D1 and D2 near or at a carried-out position or a clamping position P2.

Still referring to FIG. 1, the die carriage 20 alternately carries two dies D1 and D2 to and from the die-casting apparatus 11 in order to form die-cast products. The carriage rails 31 and the die rails 32, 34 are located to form a substantially T-shape in a plan view and each have a pair of parallel rails. The carriage rails 31 extend at least between the casting position P1 and the carried-out position P2. The carriage rails 31 are a shared path to transfer the die D1 or D2 by the die carriage 20. The carriage rails 31 permit the die carriage 20 to reciprocate in the direction that is indicated by a double-headed arrow. The die rails 32 extend at least between the carried-out position P2 and the opening/closing position P3, and the die rails 34 extend at least between the carried-out position P2 and the opening/closing position P4. Each of the die rails 32 and 34 is located near the carried-out position P2 and is perpendicular to the carriage rails 31.

The rails 31, 32 and 34 are located to form a T-shape in a plan view. The die carriage 20 provides a pair of onboard rails 22 that is perpendicular to the carriage rails 31. The onboard rails 22 are substantially connected to the die rails 32 and 34 at the carried-out position P2. Namely, the onboard rails 22 and the die rails 32, 34 extend in series along a hypothetical linear line when the die carriage 20 is at the carried-out position P2. Assuming that the die D1 contains the cast product and is positioned at the carried-out position P2, the die D1 is smoothly transferred from the onboard rails 22 of the die carriage 20 to the die rails 32. After transferred onto the die rails 32, the die D1 is opened in the direction of the die rails 32 by the multi-function die apparatus 50A. Similarly, assuming that the die D2 contains the cast product and is located at the carried-out position P2, the die D2 is also smoothly transferred from the onboard rails 22 of the die carriage 20 to the die rails 34. After transferred onto the die rails 34, the die D2 is opened in the direction of the die rails 34 by the multi-function die apparatus 50B. The die carriage 20 provides a stopping device, which is not shown in the drawing, and the stopping device locks and releases the dies D1 and D2 with the die carriage 20.

Still referring to FIG. 1, the dies D1 and D2 are alternatively carried to and from the die-casting apparatus 11. For example, after the casting operation of the die D1 has completed, the die carriage 20 transfers the die D1 to the carried-out position P2. The multi-function die apparatus 50A stands by at the carried-out position P2 in advance. Strictly, the multi-function die apparatus 50A is positioned at the left side of the carriage rails 31 on the die rails 32. Subsequently, the multi-function die apparatus 50A holds the die D1 at the carried-out position P2 and moves to the opening/closing position P3. Due to the above motion of the multi-function die apparatus 50A, the die D1 is transferred along the onboard rails 22 and the die rails 32 from the carried-out position P2 on the die carriage 20 to the opening/closing position P3. During the transfer of the die D1 or upon arriving at the position P3, the die D1 is opened in a horizontal direction or the transferring direction of the die D1. After opening the die D1, a die-cast product is released from the die D1, and the die D1 is sprayed with a die releasing agent. Then, the die D1 is closed.

On the other hand, when the die D1 is opened at the opening/closing position P3, the die D2 at the opening/closing position P4 is transferred from the position P4 to the carried-out position P2 by the multi-function die apparatus 50B. Namely, the multi-function die apparatus 50B that holds the die D2 moves across the carriage rails 22 and onto the die rails 32. As a result, the multi-function die apparatus 50B is positioned at the left side of the carriage rails 31 on the die rails 32, and the die D2 is loaded onto the die carriage 20 along the onboard rails 22. Thus, the die D1 is replaced by the die D2 on the die carriage 20.

Subsequent to the loading operation of the die D2, the clamping system 60 releases the die D2. After the release, the die D2 is transferred to the casting position P1 by the die carriage 20, and the casting operation is performed on the die D2 at the casting position P1. After the casting operation has completed, the die D2 is transferred from the casting position P1 as in the case of the die D1. Thus, the above described operations repeat, and the die-casting system 10 alternates between the die D1 and the die D2.

Figure 2:
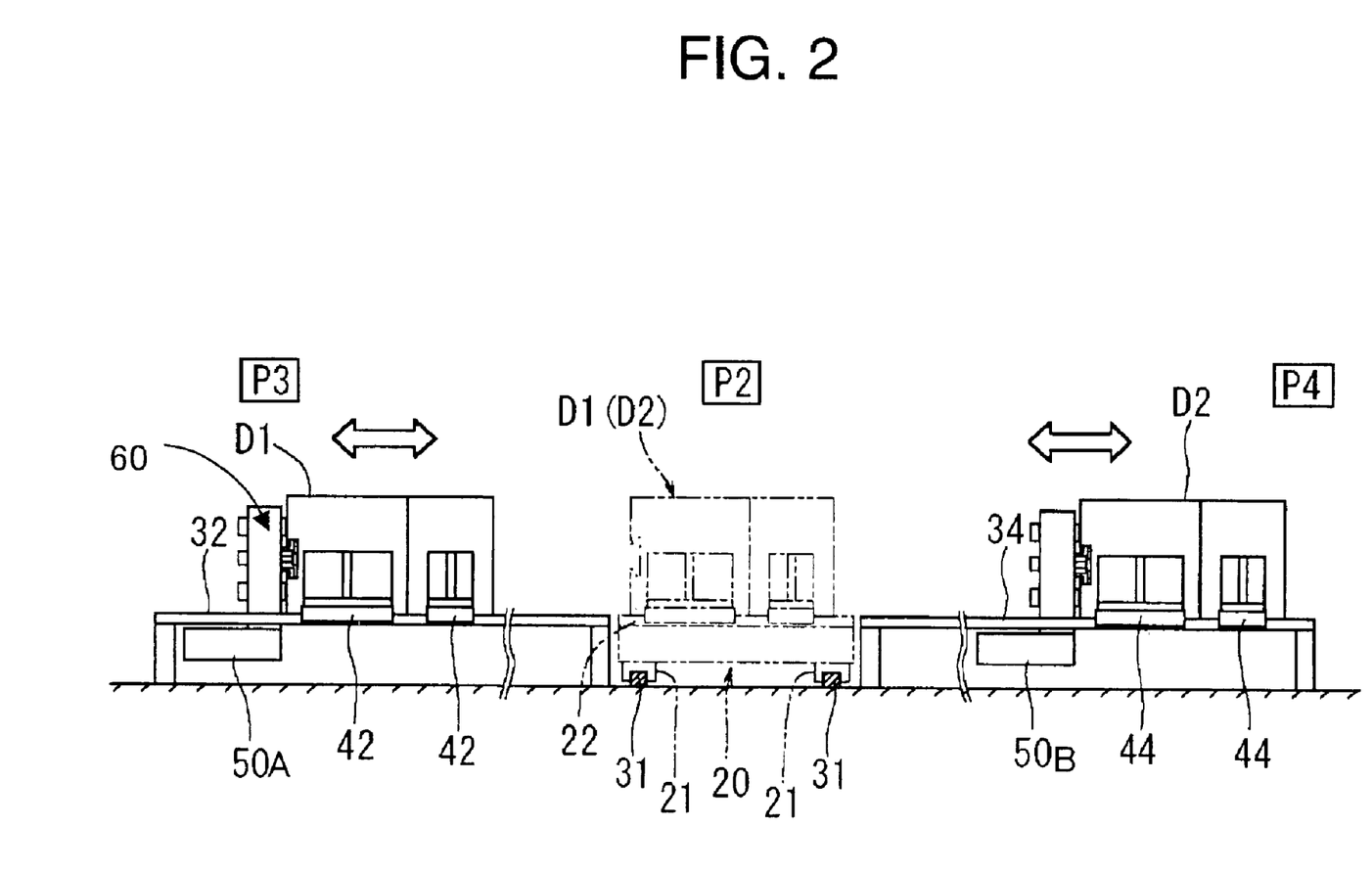
FIG. 2 is a cross-sectional view of the die-casting system taken along the line I—I in FIG. 1.

Now referring to FIG. 2, a diagram illustrates a cross-sectional view that is taken along the line I—I in FIG. 1. The die carriage 20 reciprocates in the above-mentioned direction out of the page by means of sliders 21. After the die carriage 20 loading the die D1 or D2 has arrived at the carried-out position P2, the dies D1 and D2 have been respectively clamped with the clamping system 60. After the above clamping operation, the multi-function die apparatuses 50A and 50B initiate to transfer the dies D1 and D2 respectively toward the opening/closing positions P3 and P4, and the dies D1 and D2 respectively move to the die rails 32 and 34 from the onboard rails 22 by means of sliders 42 and 44.

Still referring to FIG. 2, the clamping system 60 clamps the dies D1 and D2 with the corresponding multi-function die apparatuses 50A and 50B before the dies D1 and D2 are transferred from the carried-out position P2 respectively toward the opening/closing positions P3 and P4. Also, the clamping system 60 releases the dies D1 and D2 from the corresponding multi-function die apparatuses 50A and 50B after the dies D1 and D2 have been transferred respectively from the opening/closing positions P3 and P4 to the carried-out position P2.

Figure 3:
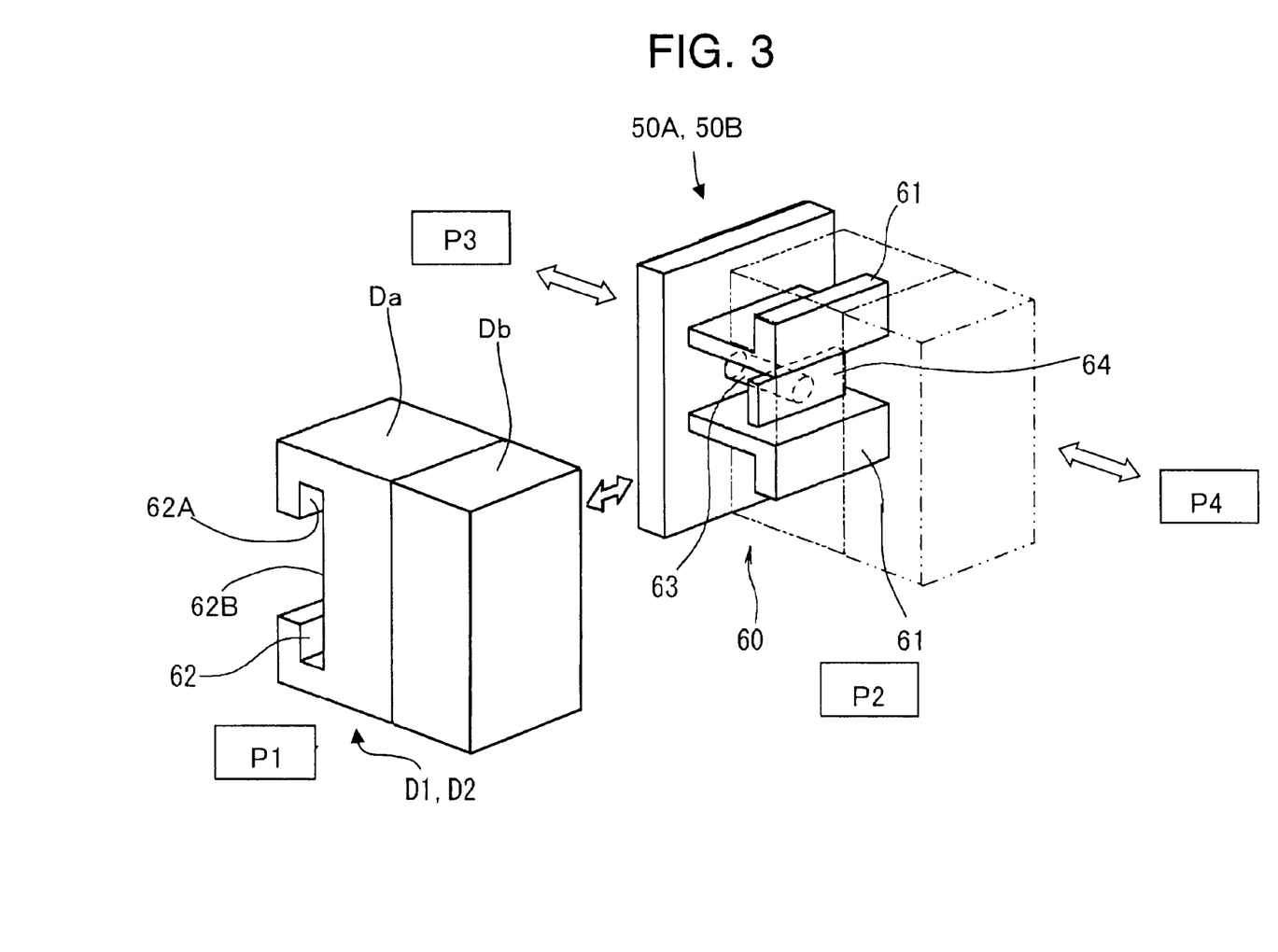
FIG. 3 is a schematic view of the clamping system for the die.

Now referring to FIG. 3, a diagram illustrates a perspective view of the dies D1 and D2 and the clamping system 60. Each of the dies D1 and D2 has a set of fixed die part Da and a movable die part Db. The clamping system 60 includes a substantially T-shaped hook 61 and a substantially T-shaped groove 62, which are respectively formed on the multi-function die apparatuses 50A, 50B and the fixed die part Da of the dies D1 and D2.

After the casing operation has completed, the dies D1 and D2 are respectively transferred from the casting position P1 toward the carried-out position P2. The clamping system 60 initiates to clamp the dies D1 and D2 as the dies D1 and D2 respectively approach the carried-out position P2. The dies D1 and D2 have been clamped by means of the clamping system 60 by the time when the dies D1 and D2 respectively arrive at the carried-out position P2. Namely, the T-shaped hook 61 enters into the T-shaped groove 62 as the dies D1 and D2 respectively approach the carried-out position P2. Thus, the T-shaped hook 61 engages the T-shaped groove 62. Additionally, the clamping system 60 further includes a clamping cylinder 63 and a die support 64. After completing the above engagement, the die support 64 presses an inner surface 62B of the T-shaped groove by actuating the clamping cylinder 63. Due to the above pressing, the T-shaped hook 61 contacts an opposite inner surface 62A of the T-shaped groove 62 with a sufficient amount of area to reduce rattling. After the above securing operation, the multi-function die apparatus 50A and 50B respectively move the dies D1 and D2 to the opening/closing positions P3 and P4 to open them.

After the opening operation has completed, the dies D1 and D2 are respectively transferred from the opening/closing positions P3 and P4 to the carried-out position P2. Subsequently, the clamping cylinder 63 contracts to separate the die support 64 from the inner surface 62B of the T-shaped groove 62. After the above releasing operation, the die carriage 20 transfers the dies D1 and D2 into the casting position P1 in the die-casting apparatus 11. Due to the above movement of the dies D1 and D2, the T-shaped groove 62 leaves the T-shaped hook 61. Thus, the dies D1 and D2 are de-engaged from the multi-function die apparatus 50A and 50B.

Figure 4:
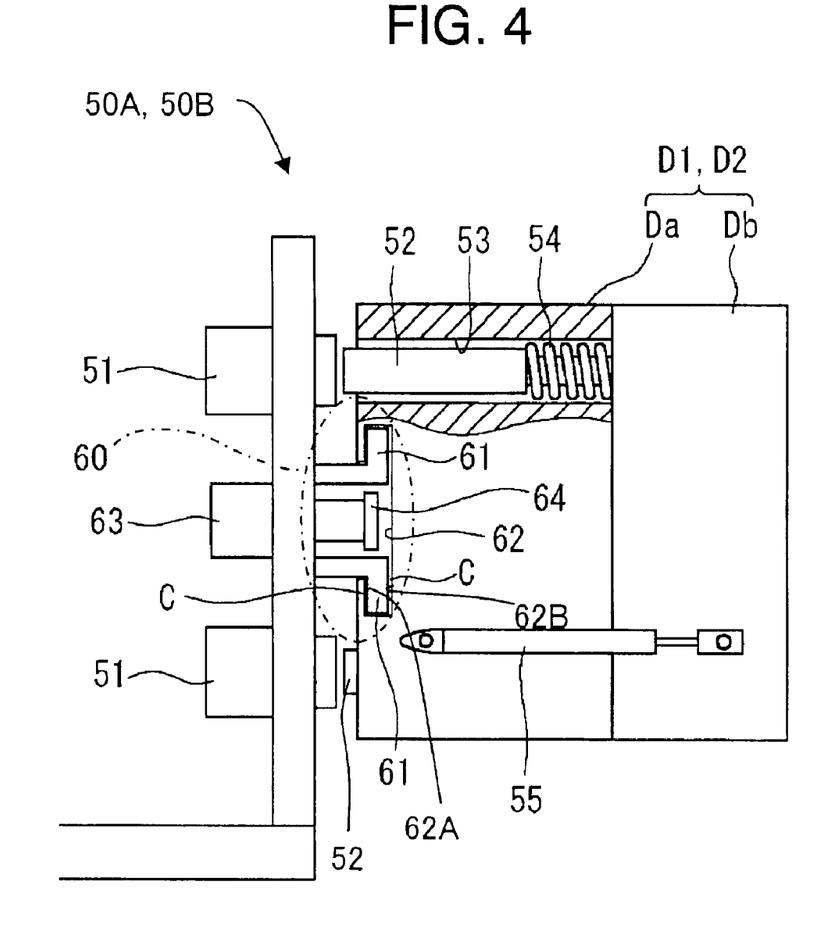
FIG. 4 is a side elevation of a multi-function die apparatus and a clamping system upon closing a die.

Now referring to FIG. 4, a diagram illustrates a side view of the multi-function die apparatuses 50A, 50B and the clamping system 60 in a state where the T-shaped hook 61 engages the T-shaped groove 62 and the clamping cylinder 63 is not actuated. The multi-function die apparatus 50A, 50B each include a plurality of cylinders 51 that are characterized by a high pressure and a short stroke distance. The multi-function die apparatuses 50A and 50B also include a plurality of cylinders 55 that are characterized by a low pressure and a long stroke distance. The high-pressure cylinders 51 are located separately from the dies D1 and D2. The multi-function die apparatuses 50A, 50B also include push pins or assistant members 52. Each of the push pins 52 extends through a through hole 53 that is formed through the fixed die part Da. The push pins 52 are usually urged by corresponding return springs 54 to be placed at an initial position where the push pins 52 do not contact the die matching surface of the movable die part Db.

Still referring to FIG. 4, the T-shaped hook 61 engages the T-shaped groove 62. The inside area of the T-shaped groove 62 is larger than the T-shaped hook 61. A sufficient clearance C exists between the T-shaped hook 61 and the inner surface of the T-shaped groove 62. Due to the clearance C, when the T-shaped hook 61 engages the T-shaped groove 62, the T-shaped hook 61 smoothly enters into the T-shaped groove 62. However, since the clamping cylinder 63 has not actuated, the above clearance C may cause the dies D1 and D2 to rattle during the transfer of the dies D1 and D2.

Figure 5:
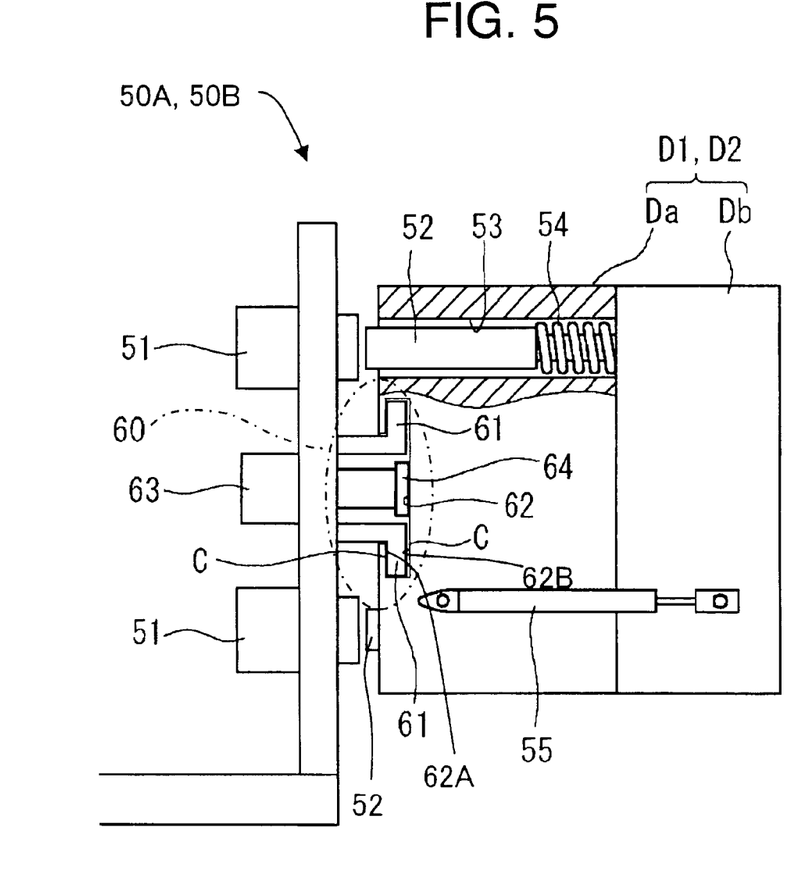
FIG. 5 is a side elevation of the multi-function die apparatus and the clamping system.

Now referring to FIG. 5, a diagram illustrates a side view of the multi-function die apparatuses 50A, 50B and the clamping system 60. After the T-shaped hook 61 engages the T-shaped groove 62, the die support 64 pushes the inner surface 62B of the T-shaped groove 62 by actuating the clamping cylinder 63. Due to the above pushing, the T-shaped hook 61 is pressed against the opposite inner surface 62A of the T-shaped groove 62. The T-shaped hook 61 has a sufficient contact surface that contacts the inner surface 62A to secure the dies D1 and D2 to the corresponding multi-function die apparatuses 50A and 50B. Thereby, the dies D1 and D2 are prevented from rattling while moving between the carried-out position P2 and the corresponding opening/closing positions P3 and P4.

Figure 6:
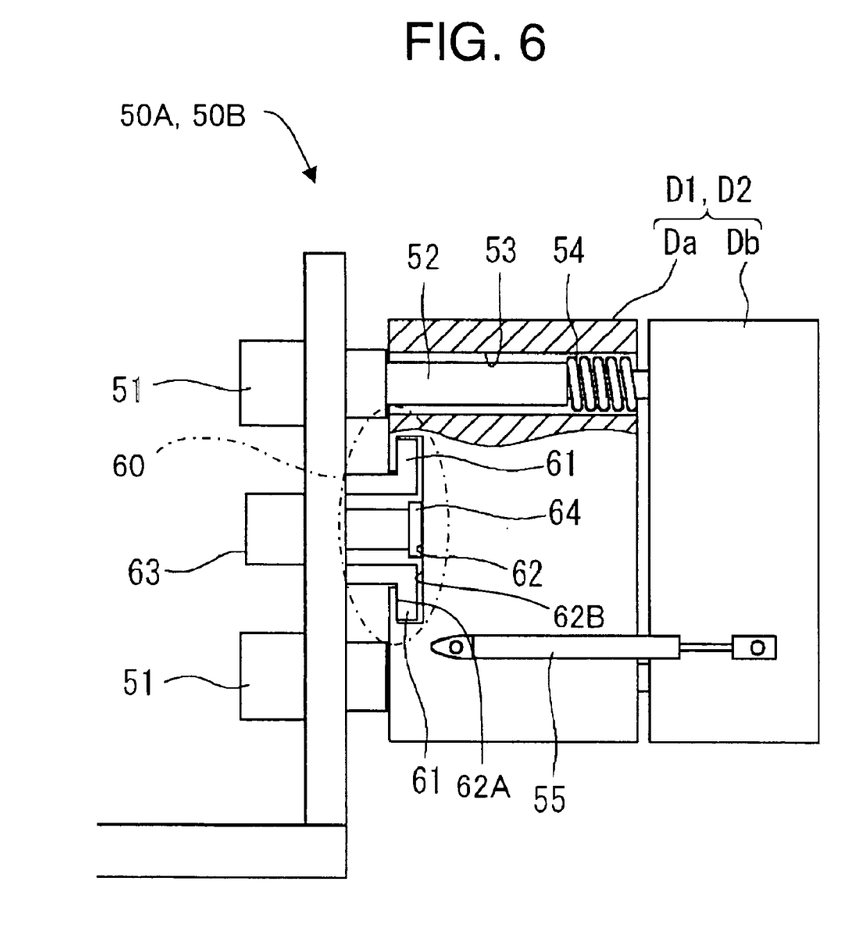
FIG. 6 is a side elevation of the multi-function die apparatus and the die upon initially opening the die.

Now referring to FIG. 6, a diagram illustrates a side view of the multi-function die apparatuses 50A, 50B and the die D1 or D2 in a state where the high-pressure cylinders 51 initiate to open the die D1 or D2. The high-pressure cylinders 51 initially open the die D1 or D2 by separating the parts Da and Db over a relatively short distance by transmitting thrust to the movable die part Db. The thrust generated by the high-pressure cylinders 51 transmits through the push pins 52 in a predetermined direction to separate the movable die part Db. That is, the thrust from the high-pressure cylinders 51 directly transmits in the direction in which the high-pressure cylinders 51 extend without changing the direction of the force. When the high-pressure cylinders 51 operate to push a first end of the push pins 52, the other end of the push pins 52 pushes a die matching surface of the movable die part Db. The first end is the end near a bottom of the fixed die part Da.

Figure 7:
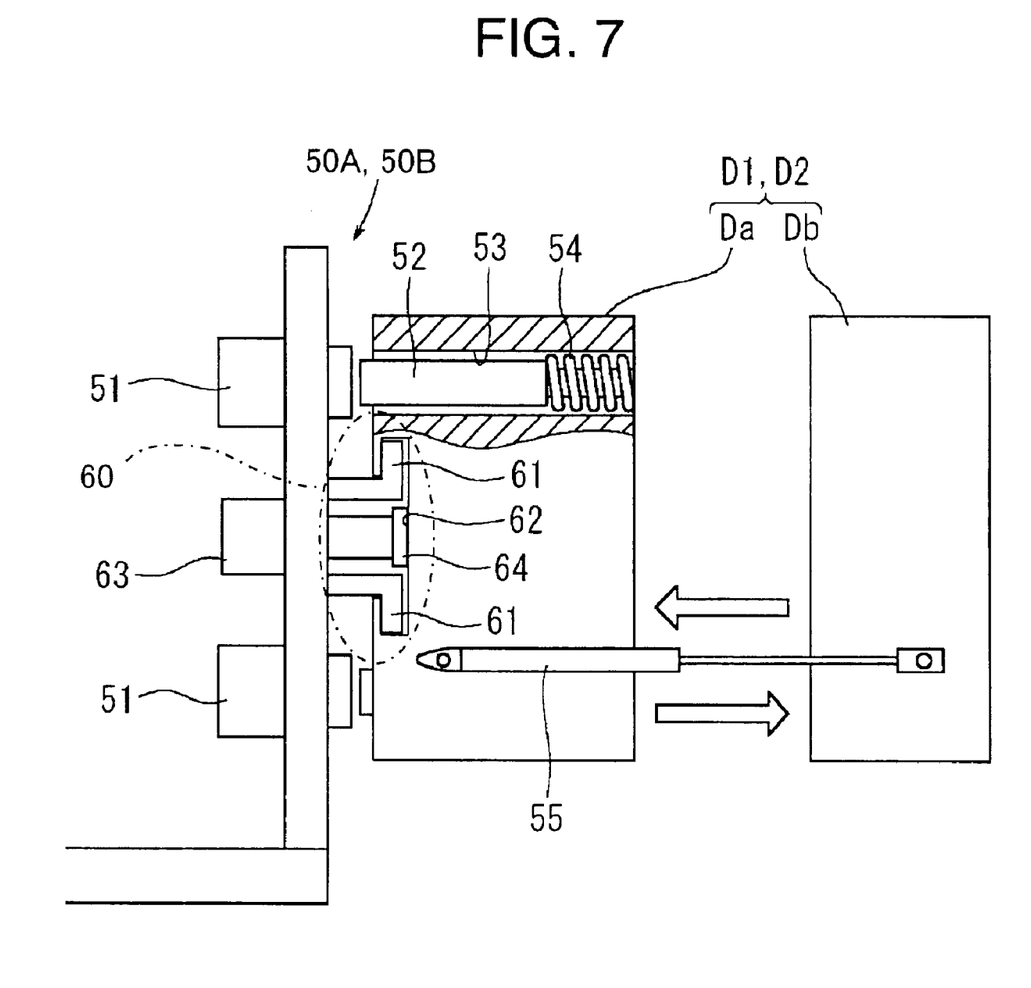
FIG. 7 is a side elevation of the multi-function die apparatus and the clamping system upon opening the die.

Now referring to FIG. 7, a diagram illustrates a side view of the multi-function die apparatuses 50A, 50B and the clamping system 60 in a state where the low-pressure cylinders 55 open the die D1 or D2. Subsequent to the opening operation by the high-pressure cylinders 51, the low-pressure cylinders 55 further separate the movable die part Db from the fixed die part Da by a relatively large distance. Namely, the high-pressure cylinders 51 initially require relatively high load. After the movable die part Db is slightly separated, the subsequent load becomes relatively low to further separate the movable die part Db from the fixed die part Da. For the above reason, the low-pressure cylinders 55 have a smaller diameter than the high-pressure cylinders 51. In addition, since the low-pressure cylinders 55 extend during the initial opening operation, the opening operation is smoothly switched from the high-pressure cylinders 51 to the low-pressure cylinders 55.

Still referring to FIG. 7, it requires relatively low load to close the dies D1 and D2 after the die-cast product is released. For the above reason, only the low-pressure cylinders 55 contract to close the die D1 or D2, while the high-pressure cylinders 51 do not operate. Additionally, since the dies D1 and D2 are firmly closed by the die-casting apparatus 11 before casting, the low-pressure cylinders 55 do not need to close under high pressure.

Figure 8:
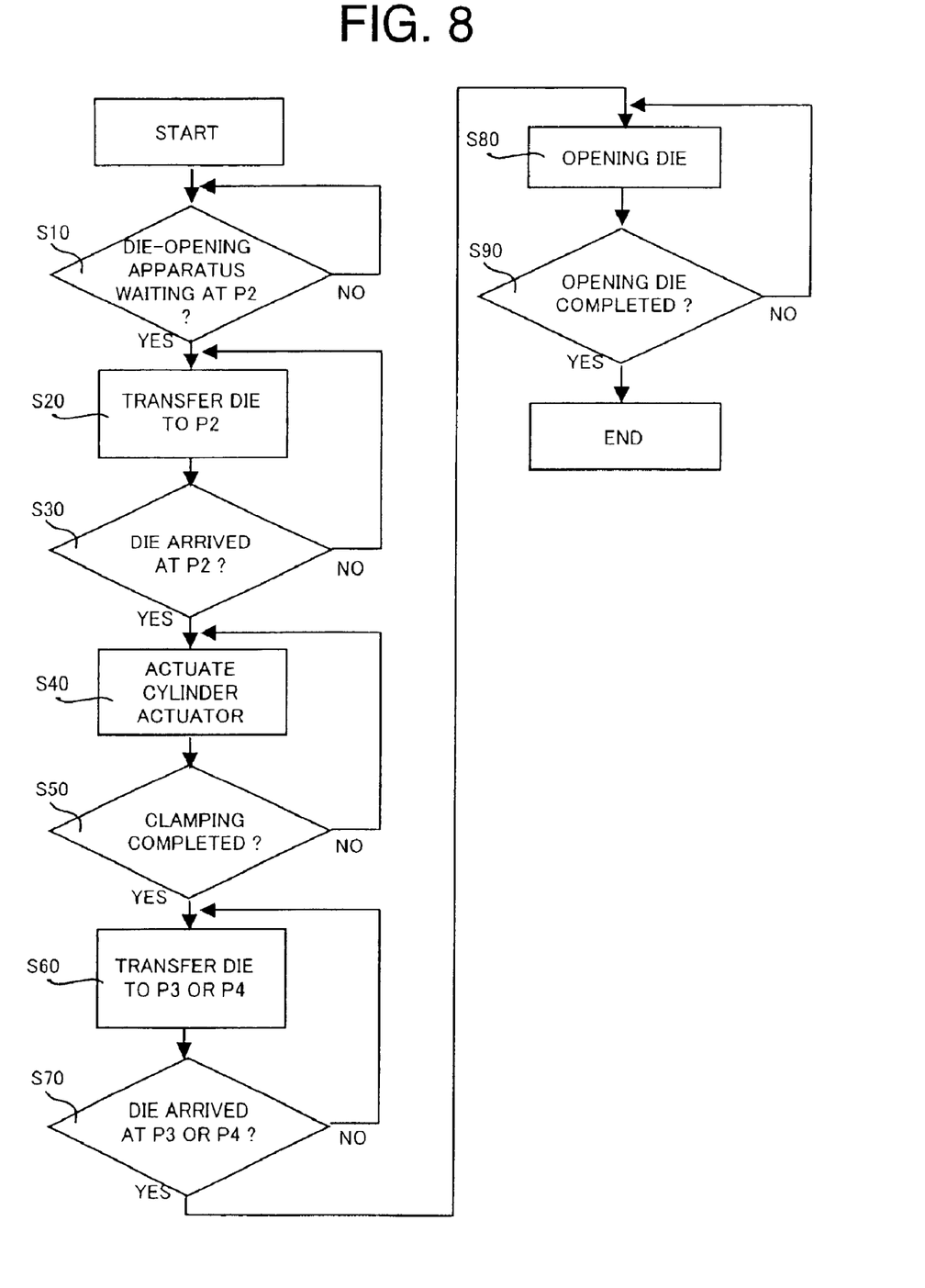
FIG. 8 is a flow chart illustrating steps involved in a preferred method of clamping a die according to the current invention.

Now referring to FIG. 8, FIG. 8 is a flow chart illustrating steps involved in a preferred method of clamping a die according to the current invention. To further illustrate some of the steps, the above described units or components of the preferred embodiments are referred to perform certain operations. It is determined whether or not the multi-function die apparatus 50A or 50B is waiting at the carried-out position P2 in a step S10. When the determination in the step S10 is true, the die D1 or D2 is transferred to the carried-out position P2 to engage the T-shaped hook 61 with the T-shaped groove 62 by the die carriage 20 in a step S20. When the determination in the step S10 is false, the method goes back to the step S10. Then, it is determined whether or not the die D1 or D2 has arrived at the carried-out position P2 in a step S30. When the determination in the step S30 is true, the cylinder actuator 63 is actuated by an external command in a step S40 to secure the die D1 or D2 to substantially reduce rattling. When the determination in the step S30 is false, the method goes back to the step S10. Further, it is determined whether or not clamping the die D1 or D2 is completed by the clamping system 60 in a step S50. When the determination in the step S50 is true, the dies D1 and D2 are respectively transferred toward the opening/closing positions P3 and P4 by the multi-function die apparatuses 50A and 50B in a step S60. When the determination is false, the method goes back to the step S40. Meanwhile, it is determined whether or not the dies D1 and D2 are respectively arrived at the opening/closing positions P3 and P4 in a step S70. When the determination in the step S70 is true, the dies D1 and D2 are respectively opened by the multi-function die apparatuses 50A and 50B in a step S80. When the determination is false, the method goes back to the step S60. On the other hand, it is determined whether or not opening the dies D1 and D2 is completed in a step S90. When the determination in the step S90 is false, the method goes back to the step S80.

According to the preferred embodiment, the following advantageous effects are obtained. (1) In the preferred embodiment, when the dies D1 and D2 are transferred to the carried-out position P2, the T-shaped hook 61 of the corresponding multi-function die apparatuses 50A and 50B stands by at the carried-out position P2 and enters into the T-shaped groove 62 of the die D1 or D2. At the same time, the dies D1 and D2 are clamped so as not to move with respect to the corresponding multi-function die apparatuses 50A and 50B in the die opening direction. Namely, the dies D1 and D2 are respectively clamped with the multi-function die apparatuses 50A and 50B by the time when the dies D1 and D2 arrive at the carried-out position P2. Due to the above efficient operation, no positioning time for the dies D1 and D2 is required, and the multi-function die apparatuses 50A and 50B immediately initiate the next operation. As a result, operating time is reduced for clamping and opening the dies D1 and D2.

(2) In the preferred embodiment, the clamping system 60 clamps the dies D1 and D2 with the corresponding multi-function die apparatuses 50A, 50B and includes the T-shaped hook 61 and the T-shaped groove 62. The engagement of the dies D1 and D2 with the corresponding multi-function die apparatuses 50A and 50B is achieved only by the T-shaped hook 61 and the T-shaped groove 62. The clamping system 60 has relatively simple structures reducing its manufacturing costs. When the T-shaped groove 62 is formed on the dies D1 and D2, the outer surface of the dies D1 and D2 have no substantial protrusion. Accordingly, a transferring path of the dies D1 and D2 is reduced in space between the casting position P1 and the carried-out position P2.

(3) In the preferred embodiment, since the T-shaped hook 61 maintains a predetermined clearance C from the inner surface of the T-shaped groove 62, the T-shaped hook 61 smoothly enters into the T-shaped groove 62. Also, after the T-shaped hook 61 enters into the T-shaped groove 62, the die support 64 presses the inner surface 62B of the T-shaped groove 62. Due to the pressing, the T-shaped hook 61 is pressed against the opposite inner surface 62A. As a result, rattling due to the clearance C is substantially prevented, and the dies D1 and D2 appropriately accompany the corresponding multi-function die apparatuses 50A and 50B. The die support 64 presses to prevent the dies D1 and D2 from rattling, and the force is not directed to perform clamping. For this reason, since the clamping does not require relatively large force, the clamping cylinder 63 employs an air cylinder.

(4) In the preferred embodiment, after the dies D1 and D2 are transferred to the carried-out position P2, the dies D1 and D2 are moved in the horizontal direction that intersects the carried-out direction and are opened. Due to the above operation, the clamping system 60 is simply constructed. In addition, upon releasing the die-cast product, waste metal such as burrs readily drops from the dies D1 and D2. Also, a molding surface may be cleaned by spraying with the die releasing agent after the die-cast product is released.

The present invention is not limited to the above-described preferred embodiment, but is modified into the following alternative embodiments.

In alternative embodiments to the above preferred embodiment, the dies D1 and D2 have various shapes other than the shape as shown in the dies D1 and D2. Also, the die-casting system 10 either includes or utilizes only one of the dies D1 and D2.

In alternative embodiments to the above preferred embodiment, the die clamping system 60 as illustrated in the preferred embodiments is applicable to other engaging parts.

In alternative embodiments to the above preferred embodiment, the die clamping means includes a recess and a protrusion for inserting into the recess, and the dies D1 and D2 are clamped to reduce rattling by inserting the protrusion into the recess, any shape of the die clamping means is applicable.

In alternative embodiments to the above preferred embodiment, the dies D1 and D2 include the T-shaped hook 61, and the multi-function die apparatuses 50A and 50B each include the T-shaped groove 62.

In alternative embodiments to the above preferred embodiment, the die support 64 is attached to the dies D1 and D2 and pushes the T-shaped hook 61.

In alternative embodiments to the above preferred embodiment, a spring instead of the cylinder actuator is employed as pushing means. For example, the die support 64 is attached to the T-shaped groove 62 in such a manner that the die support 64 is urged in the direction perpendicular to the inserting direction of the T-shaped hook 61. When the T-shaped hook 61 enters into the T-shaped groove 62, the die support 64 elastically urges the T-shaped hook 61 and the T-shaped groove 62.

In the alternative embodiments to the above preferred embodiment, the die rails 31 are disposed on a ceiling or overhanging structure. In this case, the die carriage 20 moves along the carriage rails 31 in such a manner that the die carriage 20 is suspended from the carriage rails 31.

In the alternative embodiments to the above preferred embodiment, the multi-function die apparatuses 50A and 50B respectively open the dies D1 and D2 in a substantially vertical direction or in another direction.

Therefore, the present examples and embodiments are to be considered as illustrative and not restrictive, and the invention is not to be limited to the details given herein but may be modified within the scope of the appended claims.

What is claimed is:

1. A die-clamping system comprising:
   a die including a first engaging portion in a first predetermined shape, the die being transferred in a first direction along carriage rails from a first position toward a second position; and
   clamping means having a second engaging portion in a second predetermined shape that is complementary to the first predetermined shape, wherein the second engaging portion of the clamping means at the second position substantially clamps the first engaging portion against movement in a second direction along die rails that intersect the carriage rails by the time when the die arrives at the second position in the first direction.

2. The die-clamping system according to claim 1 further comprising:
   die opening means for opening the die in a horizontal direction.

3. The die-clamping system according to claim 2, wherein the second direction is the die opening direction.

4. The die-clamping system according to claim 2, wherein a third position is an opening/closing position in the second direction from the second position, and the die is opened between the second position and the third position.

5. The die-clamping system according to claim 1, wherein the first predetermined shape has a recess, and the second predetermined shape has a protrusion for engaging the recess.

6. The die-clamping system according to claim 5, wherein the recess is T-shaped groove, and the protrusion is a T-shaped hook.

7. The die-clamping system according to claim 5, wherein the recess has an inner surface, the die-clamping system further comprising:
   pressing means for pressing the protrusion against the inner surface of the recess to reduce rattling between the protrusion and the recess.

8. The die-clamping system according to claim 7, wherein the protrusion having a contact surface contacts the inner surface.

9. The die-clamping system according to claim 7, wherein the pressing means includes a cylinder actuator.

10. A die-clamping system comprising:
    a die including a first engaging portion having a first predetermined shape, the die being transferred along carriage rails in a first direction from a first position toward a second position; and
    clamping means having a second engaging portion in a second predetermined shape that is complementary to the first predetermined shape, wherein the second engaging portion of the clamping means at the second position substantially clamps the first engaging portion against movement in a second direction along die rails that intersect the carriage rails as the die arrives at the second position in the first direction.

11. A method of efficiently clamping a die, comprising the steps of:
    providing a die having a first engaging portion in a first predetermined shape;
    providing a clamping means having a second engaging portion in a second predetermined shape that is complementary to the first predetermined shape;
    transferring the die in a first direction along carriage rails from a first position toward a second position;
    initiating insertion of the first engaging portion into the second engaging portion;
    completing engagement of the first engaging portion with the second engaging portion by the time when the die arrives at the second position; and
    substantially clamping the first engaging portion against movement in a second direction along die rails that intersects the carriage rails.

12. The method of efficiently clamping the die according to claim 11 further comprising the step of:
    positioning the clamping means at the second position before the initiating step.

13. The method of efficiently clamping the die according to claim 11 further comprising the steps of:
    pressing the first engaging portion against the second engaging portion to reduce rattling between the first engaging portion and the second engaging portion; and
    transferring the die toward a third position from the second position in a second direction that intersects the first direction.

14. The method of efficiently clamping the die according to claim 13 further comprising the step of:
    opening the die in the second direction during the transferring step.

15. The method of efficiently clamping the die according to claim 11 further comprising the steps of:
    transferring the die from the second position toward the first position; and
    completing disengagement of the first engaging portion from the second engaging portion by the time when the die leaves the second position.

16. A method of efficiently clamping a die, comprising the steps of:
    providing a die having a first engaging portion in a first predetermined shape;
    providing a clamping means having a second engaging portion in a second predetermined shape;
    transferring the die in a first direction along carriage rails from a first position toward a second position;
    initiating insertion of the first engaging portion into the second engaging portion;
    completing engagement of the first engaging portion with the second engaging portion in a complementary manner by the time when the die arrives at the second position; and substantially clamping the first engaging portion against movement in a second direction along die rails that intersects the carriage rails.

17. The method of efficiently clamping the die according to claim 16 further comprising the step of:

transferring the clamping means toward the second position to reach the second position substantially at the same time with the die.

18. A die-clamping system comprising:

a die including a first engaging portion in a first predetermined shape, the die being transferred along carriage rails in a first direction from a first position toward a second position;

a die transfer unit for transferring said die from the second position to a third position along die rails in a second direction; and a clamping unit mounted on said die transfer unit and having a second engaging portion in a second predetermined shape that is complementary to the first predetermined shape, wherein the second engaging portion of the clamping unit at the second position substantially clamps the first engaging portion against movement in the second direction along the die rails that intersect the carriage rails by the time when the die arrives at the second position in the first direction, upon completing the engagement, said transfer unit transferring said die from the second position to the third position along the die rails.

19. The die-clamping system according to claim 18 wherein said die transfer unit transfers said die in the second direction that is perpendicular to the first direction.

20. The die-clamping system according to claim 18 wherein said clamping unit substantially clamping said die in the second direction that is perpendicular to the first direction.

* * * * *